United States Patent [19]

Kojima

[11] Patent Number: 4,879,046

[45] Date of Patent: Nov. 7, 1989

[54] LOCAL WATER CLEANING METHOD FOR USE IN CONSECUTIVE WATER AREAS

[75] Inventor: Sadao Kojima, Hachioji, Japan

[73] Assignee: Kaiyo Kogyo Kabushiki Kaisha, Tokyo, Japan

[21] Appl. No.: 208,127

[22] Filed: Jun. 17, 1988

[30] Foreign Application Priority Data

Jun. 18, 1987 [JP] Japan .................... 62-152335

[51] Int. Cl.⁴ .................................................. C02F 7/00
[52] U.S. Cl. ................................... 210/747; 210/758; 210/170; 405/62; 405/107
[58] Field of Search ............... 210/170, 747, 749, 758, 210/765; 405/62, 80, 107

[56] References Cited

U.S. PATENT DOCUMENTS

| | | | |
|---|---|---|---|
| 3,169,921 | 2/1965 | Griffith | 210/747 |
| 3,330,119 | 7/1967 | Griffith | 405/80 |
| 3,469,402 | 9/1969 | Loud | 405/62 |
| 3,505,213 | 4/1970 | Anthony et al. | 210/747 |
| 3,651,646 | 2/1972 | Grunav | 405/62 |
| 3,665,713 | 5/1972 | Ruth | 405/62 |
| 3,744,254 | 7/1973 | Fennelly | 405/62 |
| 3,762,169 | 10/1973 | Graham | 405/62 |
| 3,884,810 | 5/1975 | Smyrnow | 210/170 |
| 4,695,384 | 9/1987 | Ripl et al. | 210/747 |

FOREIGN PATENT DOCUMENTS

| | | |
|---|---|---|
| 1122726 | 4/1982 | Canada . |
| 425795 | of 1967 | Japan . |
| 56-55622 | 5/1981 | Japan . |
| 830701 | 3/1960 | United Kingdom . |

Primary Examiner—Richard V. Fisher
Assistant Examiner—Christopher Upton
Attorney, Agent, or Firm—Wenderoth, Lind & Ponack

[57] ABSTRACT

A method of processing the water in a large water region such as a river, dam, lake and marsh is in which a local water processing area is provided for water cleaning, aerating and other purposes, the local water processing area being delimited by a produced water flow produced specific depth and width of the large water region and separating the local water processing area from the remainder of the large water region.

The local water processing area may be delimited and separated by a water flow wall or barrier produced by a jet of water or a jet of air, thereby eliminating the need for any physical barrier such as sheet piles or other permanent structure and yet maintaining the continuity between the local water processing area and the rest of the large water region. In addition, the method allows the produced water flow to be localized, providing several advantages over the conventional methods in terms of the obstacleless navigation and less costly implementation.

4 Claims, 5 Drawing Sheets

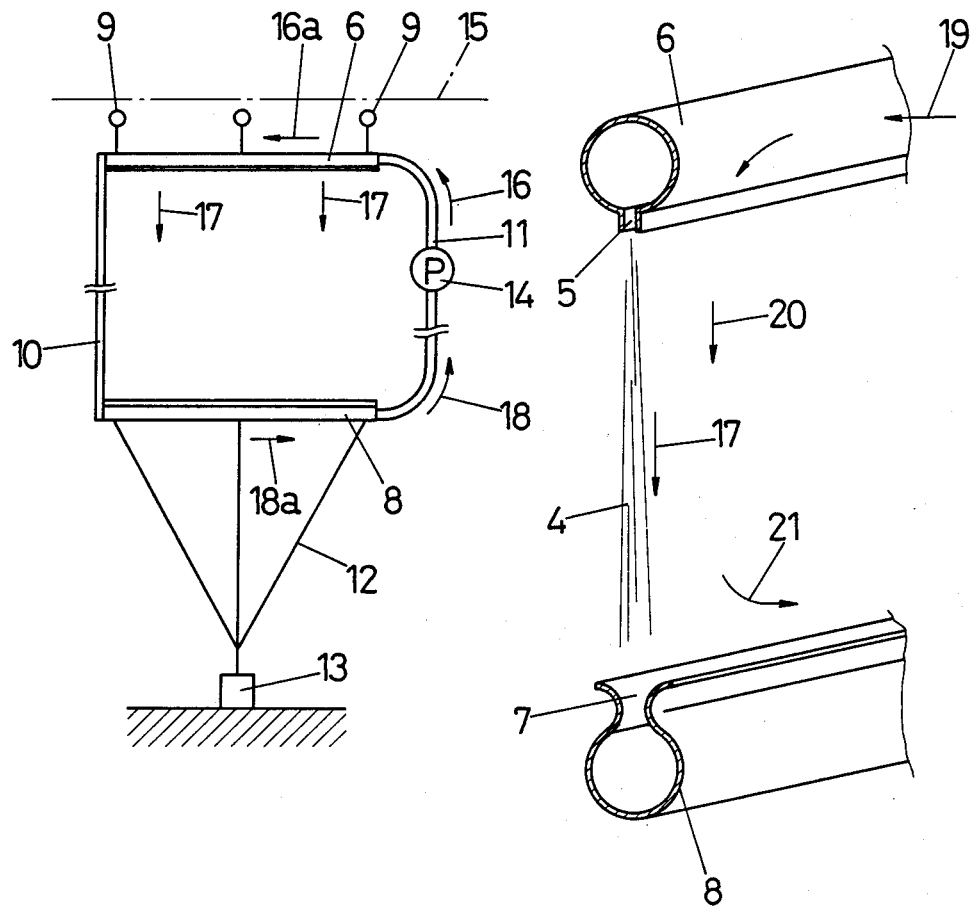

FIG. 5
FIG. 6
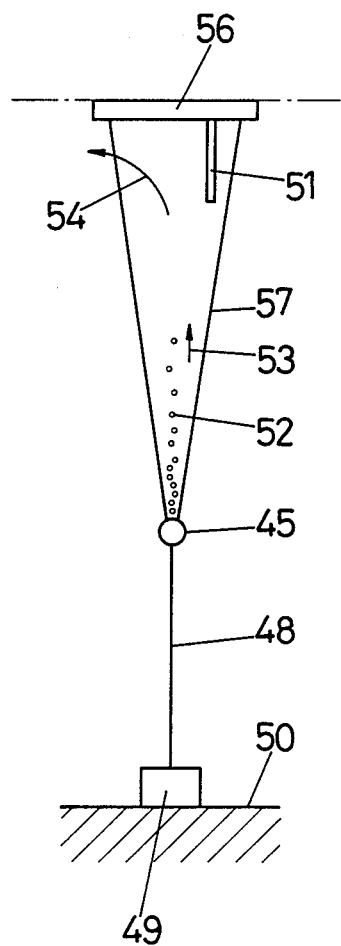
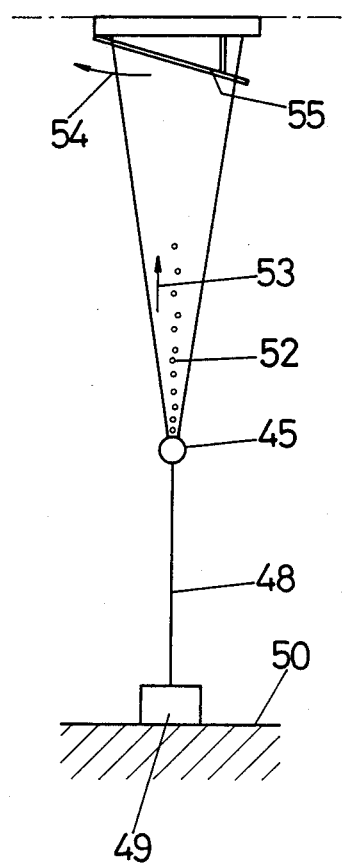

F I G. 7
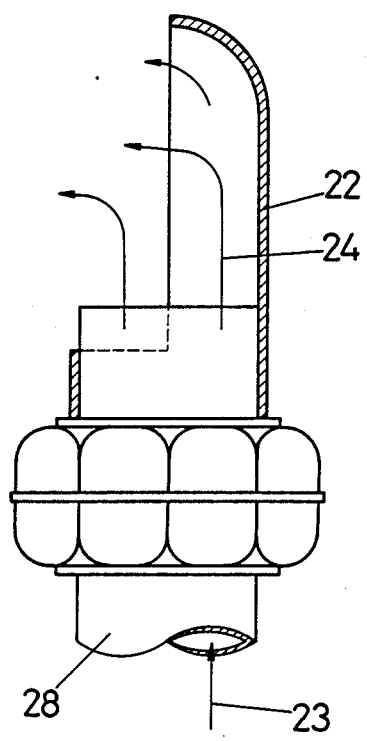
F I G. 8
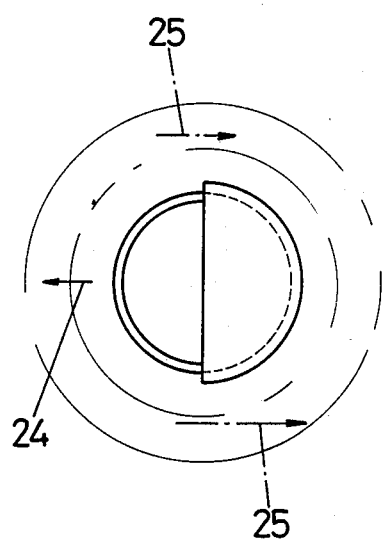

LOCAL WATER CLEANING METHOD FOR USE IN CONSECUTIVE WATER AREAS

BACKGROUND OF THE INVENTION

1. Field of the Invention

The present invention relates generally to a method of processing the water in certain water areas for water cleaning, aerating, and other purposes, which comprises producing a circulatory flow of the water between the surface and bottom of a body of water from a jet of water being raised from the bottom and being diffused over a radial range of the water area. More particularly, the present invention provides a method that has particular applications and uses in particular water areas, such as water reservoir dams, rivers, and harbors, which extend continuously over a broad area and usually contain a large amount of water that would require costly facilities if the large amount of water is to be processed all at one time. The method allows any portion of the water area to be delimited so that the water within that portion can be processed locally for water cleaning and other purposes.

2. Description of the Prior Art

A conventional apparatus comprises a tubular construction that provides a vertical passage for raising water and producing a jet of water which causes a circulatory flow of water, thereby increasing the content of oxygen and distributing it throughout the water area such as a dam, lake, marsh, and the like and enhancing the growth of micro-organisms which dissolve any harmful organic substances. This apparatus has been known as a typical water cleaning apparatus, as originally disclosed in the Japanese patent publication No. 42-5795.

Several improved versions of the original apparatus have been offered for twenty years so that a higher cost performance can be achieved. The improvements that have been made include a simple and less costly construction and less running costs, as well as the elimination of any environmental pollution that might otherwise accompany the water cleaning process. Because of those merits, the improved versions have been used in various locations across the country of Japan, for example, and have achieved their respective objectives.

SUMMARY OF THE INVENTION

For one of the conventional improved versions, for example, it has been observed that a single installation (which includes a single tubular passage of 50 cm diameter and 10 m length, for example) may be capable of handling one million tons of water, and is sufficient for that purpose. This handling capability may depend upon the dimensional requirements of the apparatus, but if a water area to be processed contains 100 million tons of water, 100 installations would be required when one installation has the above dimensions, for example. This would involve the maintenance for each of those installations. Thus, the demand has arisen for any improvement in this respect. Therefore a further improvement has been proposed by the present applicant. This improvement comprises a large-scale tubular construction that consists of multiple vertical tubular passages of 80 cm diameter each and bundled together. In the above situation, twenty or less installations may handle that amount (100 million tons) of water. In certain water areas, such as rivers flowing slowly, harbors used for a breeding ground of fishes, and large-capacity dams, which contain an ever changing flow or amount of water, the amount of water may occasionally increase drastically, and the corresponding water handling capabilities will be required to meet that amount which may exceed several 100 million tons of water. Thus, the number of installations must be increased accordingly, and the costs required for their installation and maintenance must be increased. For the above reasons, the before mentioned improved version provides no practical solution under the above described situations.

present invention may be applied to the water resource areas that extend continuously over a broad range where processing of all of the large amount of water at one time would not be required. From the study that has been made to examine possibilities of processing those water resource areas locally, it has been discovered that the local processing will be possible, rather than by relying on the conventional processing of the entire body of water. The method of the present invention is based on this discovery, and allows for the local processing of the water area. According to the present invention, any particular part of the water area can be logically separated from the rest of the water area. This part may be provided on the outlet side of the water area, for example, and the water delimited by that part may be processed locally as if it were a single smaller water area, i.e., a small-capacity water reservoir dam. According to the conventional method, this is achieved by separating that part from the rest of the water physically such as by means of a sheet pile or other barriers, or by providing a separate water processing site into which the water from the water area is branched and led so that it can be processed there. Generally, practicing the conventional method would require the very expensive facilities. In some situations where a water area is deep (such as 50 m or more, for example), it would be practically impossible to use the sheet pile or other barriers for separating the water area as described above.

It is therefore a principal object of the present invention to provide a method that allows for the local water processing by delimiting part of a large water area such as a large-capacity water reservoir dam. That part is logically separated from the rest of the water area, and the water in the part is subjected to the cleaning, aerating, or any other treatment.

According to the present invention, the part of the water area where the local water processing is to occur may be demarcated from the rest by forming a water flow wall, by which is meant the water separation effect produced by either forcing jets of water or air downwardly from the surface; and/or vice versa, which form a vertical flowing water wall or barrier for separating the two parts, or guiding a water flow by a guide member which is located at the top of the tubular construction or by diffusing a flow of water that is produced from a jet of water from the tubular construction.

The jet of water from the tubular construction diffuses over the water surface, and the diffusion of water occurs to a certain depth below the water surface. In order to ensure that the diffusion is limited to the local water processing area separated from the rest of a water area, therefore, the local water processing area may be provided by forming the water flow wall or barrier across a depth of between 1 m and 5 m beneath the water surface.

As described, the water flow wall or barrier is formed so that it can occur from the top to bottom or from the bottom to top, thereby delimiting the local water processing area. The guide member may be provided at the top of the tubular construction, and may effectively prevent the diffusing water from going toward the other part of the water area than the local water processing area.

It will be appreciated that the method of the present invention allows a particular local part of the large water area to be delimited and separated by the water flow wall or barrier from the rest of the water area so that the water in that part can be processed locally for water cleaning, and other purposes.

Specifically, if a water area to be processed contains a large amount of water such as 100 or more million tons of water, a local water processing area that always contains a smaller amount of water such as 50 or less million tons of water can be provided so that smaller amount of water can be processed there. Logically, it is equivalent to water processing in the smaller water area.

The method of the present invention is particularly suited to water processing in the large water area. It may be understood that the large water area may be logically divided into two separate parts, one being assigned to a local water processing area and the other occupying the major part of the water area from which water is to be supplied to the local water processing. Thus, the water discharging from large water area can be processed as if it was done for the small water area.

Assuming that the same situation exists for the method of the present invention and the conventional method, the conventional method will require many installations whereas the method of the present invention allows for fewer installations that can achieve the same object as for the conventional method.

BRIEF DESCRIPTION OF THE DRAWINGS

Those and other objects, features, and advantages of the present invention will become more apparent from the detailed description of several preferred embodiments that follows hereinafter by referring to the accompanying drawings, in which:

FIG. 1 illustrates the construction of means for providing a vertical water flow wall or barrier across the depth and width of a water area, which is specifically designed for use with the method of the present invention and shown as an elevation view;

FIG. 2 is a partly sectional view of FIG. 1, shown on an enlarged scale;

FIG. 5 illustrates an embodiment of means for producing a water flow wall or barrier formed by a succession of air bubbles;

FIG. 6 is a variation of the embodiment of FIG. 5;

FIG. 7 is a partly enlarged view of a tubular construction including a guide member for preventing a jet of water from diffusing in the direction opposite to the local water processing area;

FIG. 8 is an enlarged plain view of FIG. 7;

DETAILED DESCRIPTION OF THE PREFERRED EMBODIMENTS

EXAMPLE 1

Figure 3:
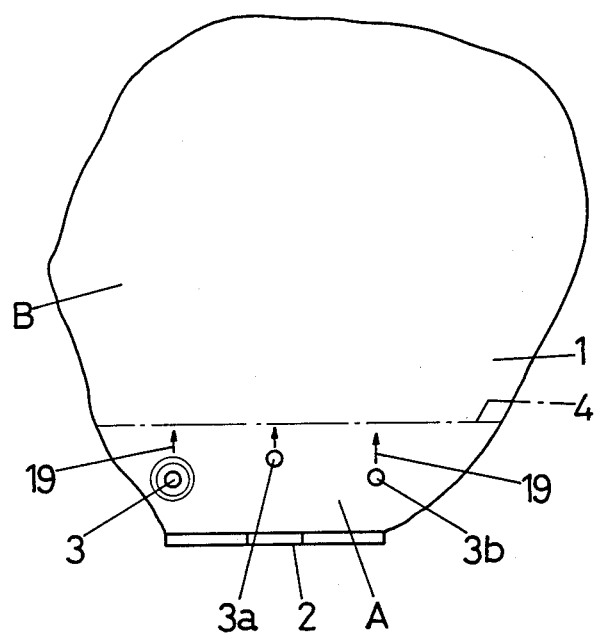
FIG. 3 is a schematic diagram illustrating a typical large water area where the method of the present invention is implemented.

FIGS. 1 through 3 illustrate the construction of means for producing a water flow wall or barrier across the depth and width of a water area according to the method of the present invention, and one preferred embodiment thereof is now described in detail by referring to FIGS. 1 through 3.

Figure 4:
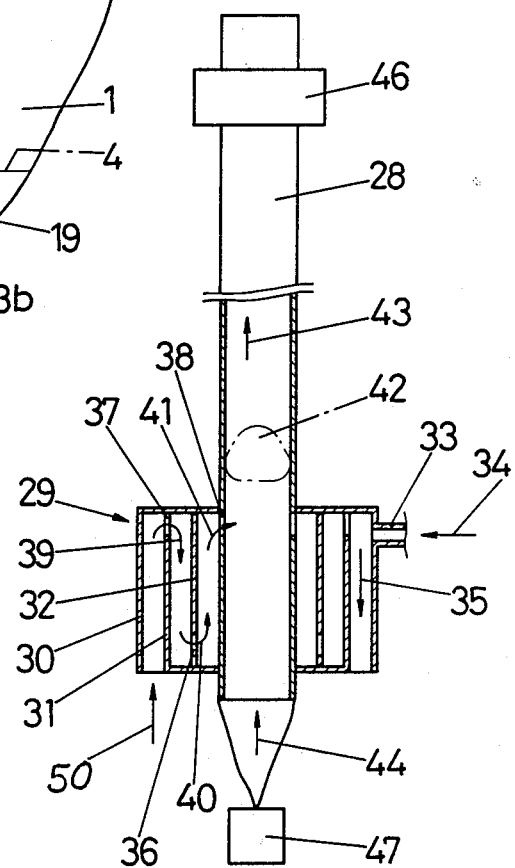
FIG. 4 is an enlarged sectional view of a typical tubular construction for use with the method of the present invention.

Referring particularly to FIG. 3, there is a cammed water reservoir 1 shown as an example, having an outlet port 2 through which water in the reservoir 1 is drawn. There are several locations adjacent the outlet port 2 where tubular constructions 3, 3a, 3b as shown in FIG. 4 are installed. The area A of the reservoir 1 where those tubular constructions are located is demarcated from the rest of the dam 1 by an imaginary line 4 across the reservoir shown as a dot-dash line. That is, this imaginary line 4 is actually formed by a vertical water flow wall or barrier across the depth and width of the reservoir which is located on the upstream side of the outlet port 2. Referring then to FIGS. 1 and 2, the apparatus for producing the vertical water flow 4 includes an upper water conduit 6 having a longitudinal slit 5 open on the bottom side of the conduit 6, and a lower water conduit 8 having a longitudinal slit 7 opposite the longitudinal slit 5 for the conduit 6 for accepting the water flow from the upper water conduit 6 by a drawing action. The apparatus is suspended below the water surface 15 by means of floats 9 which are mounted on the upper water conduit 6. The upper and lower water conduits 6 and 8 are connected by a connecting member 10 and a water circulating pipe 11 between them. A weight which acts as an anchor resting on the reservoir bottom holds the lower water conduit 8 by means of ropes 12 connecting the weight and conduit. Thus, the upper water conduit 6 is held 50 cm to 2 m deep beneath the surface 15 (regardless of how deep the water area is), and the lower water conduit 8 is located 5 m to 10 m deep. A water pump 14 is disposed in the water circulating passage 11. How deep the upper and lower water conduits 6 and 8 should be located below the water surface 15, respectively, may depend upon how deep the jets of water from the tubular constructions 3, 3a, 3b should travel and diffuse.

In operation, the pump 14 is started up (in FIG. 1), pumping out water which is forced to flow through the water circulating passage 11 in the direction of the arrow 16 and then through the upper water conduit 6. The water flow through the upper conduit 8 occurs as indicated by an arrow 16a, and is ejected downwardly from the longitudinal slit 5 as indicated by an arrow 17. The ejected water is forced to travel down toward the lower water conduit 8 where it is drawn under the suction action and introduced into the conduit 8 through its longitudinal slit 7. The water that has been received by the lower water conduit 8 then is forced to travel back to the pump 14 through the water circulating passage 11, as indicated by arrows 18a and 18. It may be appreciated from the above description that the water flow from the upper to lower water conduits 6 and 8 forms a water flow wall or barrier 4 between the two conduits, as shown in FIG. 2. As this water flow wall or barrier is formed across the width of the water area as delimited by the dot-dash lines 4 in FIG. 3 and the depth defined by the upper and lower water conduits 6 and 8, the jets of water from the respective tubular constructions 3, etc. which travel and diffuse to the depth below the surface can be restricted by the water flow wall or barrier 4, and the water flow from these jets changes its direction, following the paths as indicated by arrows 19, 20, 21 in FIG. 2. Thus, the water flow circulates in the local area A delimited by the dot-dash lines (water flow wall or barrier 4) and the outlet port 2, and the local water processing can occur there.

It will be appreciated that the amount of water processed within the local area A may be let out of the area A through the outlet port 2. When the amount of water processed has left the local area A, an amount of water that corresponds substantially to that amount of water enters the local area A through the water wall or barrier 4. For some local areas A which contain a small amount of water (such as 10 million tons, for example) as compared with the total amount of water to be processed for a day (such as two million tons, for example), each amount of water that enters the local area can be processed in a less time, and can be let out as clean water.

Referring next to FIG. 4, a typical tubular construction that may be used in conjunction with the method of the present invention is described.

The tubular construction shown and described consists of a single tubular passage formed by a vertical tube. It should be understood that the tubular construction may consist of multiple tubular passages formed by individual vertical tubes which are combined together into a large-capacity tubular construction, and the following description applies to the multiple-tube construction.

In FIG. 4, the tubular construction comprises a single vertical tube 28 that provides a tubular passage through which a formed air bubble is rising as described later. On the bottom side of the vertical tube 28, there is a circular air supply chamber 29 mounted around the tube 28 and which produces a formed air bubble. The air supply chamber 29 includes an outer chamber 30, an intermediate chamber 31 and an inner chamber 32, each of those chambers being defined by the coaxial casings. In FIG. 4, there are also a float 46 and a weight 47. An air delivery hose 33 extends from the outer casing 30 defining the outer chamber to an air supply source (not shown). An air stream under pressure through the air delivery hose 33 enters the outer chamber 30 as indicated by an arrow 34. As the air stream is filling the outer chamber 30 and then the intermediate room 31 which communicates with the outer chamber, the water inside the outer and intermediate chambers is being depressed as indicated by an arrow 35, until its level reaches the position where an air communicative hole 36 is located. As the intermediate and inner chambers communicate with each other through the air communicative hole 36, the air flows from the outer chamber and then through the intermediate chamber into the inner chamber, successively through the air communicative holes 37, 36 and 38, as indicated by arrows 39, 40, and 41. Finally, the air stream is forced out from the inner chamber into the tubular passage 28 in the form of an air mass. This air mass is then formed into a single air bubble 42, which rises under its own buoyancy through the tubular passage 28, as indicated by an arrow 43. The air bubble 42 raises the water below it as indicated by arrow 44 by a drawing action. As the air bubble reaches the top end of the tubular passage 28 and is ejected therefrom, the water following the air bubble is jetted out. This jet of water diffuses radially about the tubular construction. As no air exists in the air supply chamber 29 after the first air mass has left the air supply chamber, placing the air supply chamber under the atmospheric pressure, water begins to enter the air supply chamber again from the open bottom of the outer chamber 30 as indicated by arrow 58, filling the outer and intermediate chambers. Then, the air supply chamber is placed in its original state, in which a second air stream is then delivered into the air supply chamber. This process is repeated. Those air streams are supplied at specific intervals, and are forced out under the siphon action from the air supply chamber 29 into the tubular passage. Then, each succeeding air stream is formed into an individual air bubble.

EXAMPLE 2

Referring next to FIGS. 5 and 6, a variation of the previous embodiment is described. In this embodiment, the water wall flow or barrier is formed by a succession of air bubbles.

An air delivery conduit 45 is disposed on the bottom or to a depth (such as 25 m deep below the surface), extending across the width of the water area. The air delivery conduit 45 is suspended from a float 56 above it. The conduit 45 and float 56 are connected by ropes 48. An anchor weight 49 which rests on the bottom 50 holds the air delivery conduit 45 stationary. The anchor weight 49 and conduit 45 are connected by ropes 48. The float 45 has a vertical guide member 51 extending downwardly therefrom. The air delivery conduit 45 has a longitudinal slit on the upper side thereof, from which air under pressure is ejected. A succession of air bubbles is formed from the ejected air, rising toward the surface as indicated by an arrow 53. Those air bubbles are followed by water which forms a water flow wall or barrier. As described earlier, this water flow wall or barrier delimits the local water processing area separated from the rest of the water area. The water flow following the air bubbles occurs until it impinges upon the guide member 51 where it is guided to travel in the direction of an arrow 54.

FIG. 6 is a variation of FIG. 5, in which the float 56 has an inclined guide member 55 extending downwardly at an angle with regard to the float. The water flow following the air bubbles occurs until it impinges upon the inclined guide member 55 where it is guided to travel in the direction of an arrow 54.

EXAMPLE 3

Figure 9:
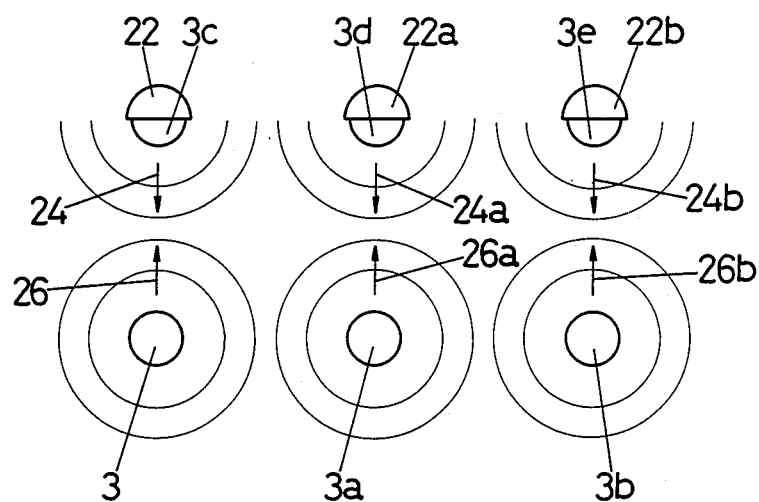
FIG. 9 illustrates one arrangement of the tubular constructions including the tubular constructions having the guide members located across the dot-dash in FIG. 3

Referring next to FIGS. 7 through 9, another preferred embodiment is shown and described. In this embodiment, the tubular construction consists of a single vertical tube 28 for providing a formed air bubble passage, such as from a tubular construction as shown in FIG. 4, at the top end of which there is a guide member 22 having a semi-circular transverse cross-section and extending upwardly and curved inwardly in longitudinal cross-section from the top end of the tube 28. In the example shown in FIG. 9, there are several tubular constructions 3c, 3d, and 3e having the respective guide members 22, 22a and 22b, which are located parallel to each other. Referring back to FIG. 7, water is drawn into the air bubble passage 28 under the drawing action of the rising air bubble, as indicated by an arrow 23, and is then jetted out as indicated by an arrow 24. This jet of water is guided along the guide member 22, diffusing in the lateral direction of the arrow 24. The diffusion of the jet of water in the direction of an arrow 25 is effectively prevented by the guide member 22. Each of the tubular constructions 3c, 3d, and 3e is paired with each of the corresponding tubular constructions 3, 3a, and 3b which are not equipped with the guide members 22, etc. Thus, the jets of water from the respective tubular constructions 3, 3a, and 3b that are diffusing in the directions of arrows 26, 26a, and 26b are effectively prevented by the jets of water from the corresponding tubular constructions 3c, 3d, and 3e that are diffusing in the opposite directions of the arrows 24, 24a, and 24b. In this way, the water flows diffusing in the directions 26, etc. are repelled, and therefore are confined within the local area A delimited by the dot-dash lines in FIG. 3. There is little water flow that will enter the part B of the water area beyond the dot-dash line. Thus, the local water processing can be achieved.

EXAMPLE 4

Figure 10:
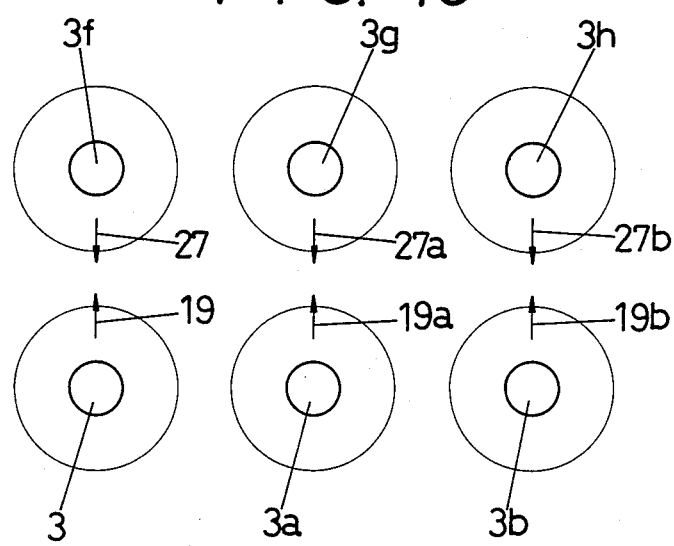
FIG. 10 illustrates another arrangement of the tubular constructions within the local water processing area.

Referring to FIG. 10, there are several tubular constructions 3f, 3g, 3h arranged along the dot-dash line 4 in FIG. 3 and several tubular constructions 3, 3a, 3b arranged on a line in the local water processing area A. The tubular constructions 3f, 3g, 3h are not equipped with the guide members 22, and the tubular constructions 3, 3a, 3b are also not equipped with the guide members. Although the tubular constructions 3f, 3g, 3h may provide jets of water, some portions of which diffuses toward the other part B of the water area, the other parts of the jets of water diffuse toward the local water area A as indicated by arrows 27, 27a, 27b. Thus, those portions of the jets of water from the tubular constructions 3, 3a, 3b which diffuse toward the tubular constructions 3f, 3g, 3h as indicated by arrows 19, 19a, 19b meet with the portions shown by 27, 27a, 27b, respectively, and can cause circulating within the local water processing area A including its adjacent areas.

Although the present invention has been described with reference to the several preferred embodiments thereof, it should be understood that various changes and modifications may be made without departing from the scope and spirit of the invention.

What is claimed is:

1. A method of cleaning or purifying water in a large water body, which large water body has a discharge end, by increasing the amount of oxygen dissolved in the water, comprising the steps of:

providing a means for forming a water flow wall for separation of the water across at least a part of the depth and along a line substantially entirely across the large water body near the discharge end for delimiting by said line a part of the large water body as a local water purifying area separate from the remainder of the large water body and separating said delimited part from the rest of the large water body for preventing the water near the surface of said local water purifying area from flowing out of the local water purifying area into the rest of the large water body; and providing in the local water purifying area a plurality of apparatuses at predetermined spaced intervals in said local water purifying area for producing a vertical water circulation in the local water purifying area between the surface and the bottom thereof, each apparatus supplying individually formed air bubble masses at regular intervals through a vertical water diffuser tube, said air bubble masses being followed by water being drawn under the action of the air bubble masses to produce jets of water for causing the vertical water circulation.

2. A method as claimed in claim 1 wherein the step of providing the water flow wall forming means comprises providing a means for producing jets of water flowing vertically downwardly from the surface area along said line.

3. A method as claimed in claim 1 wherein the step of providing the water flow wall forming means comprises providing a means for producing jets of water flowing vertically upwardly from the bottom of said water flow wall along said line.

4. A method as claimed in claim 1 wherein the step of providing said means for forming said water flow wall comprises positioning a plurality of said apparatuses for providing vertical water circulation in a row substantially along said line, and positioning the remainder of said plurality of apparatuses for providing vertical water circulation in a plurality of rows extending in substantially the same direction as said line and with the rows spaced from each other in the direction from said line toward said discharge end, whereby the flow of water coming out of the tops of the water diffuser tubes in the row of apparatuses substantially along said line breaks the force of the water flow from the tops of the water diffuser tubes in the rows of apparatuses closer to said discharge end for thereby preventing water from flowing out of said local water purifying area into the remainder of said large water body.

* * * * *